US007690376B1

(12) United States Patent
Tucci et al.

(10) Patent No.: US 7,690,376 B1
(45) Date of Patent: Apr. 6, 2010

(54) DEEP FAT FRYER WITH IMPROVED HEAT TRANSFER

(75) Inventors: David W Tucci, Northfield, NH (US); Anthony F. Reale, Burnstead, NH (US)

(73) Assignee: Pitco Frialator, Inc., Concord, NH (US)

( * ) Notice: Subject to any disclaimer, the term of this patent is extended or adjusted under 35 U.S.C. 154(b) by 876 days.

(21) Appl. No.: 10/327,078

(22) Filed: Dec. 24, 2002

(51) Int. Cl.
A47J 27/00 (2006.01)
A47J 27/026 (2006.01)

(52) U.S. Cl. .................... 126/391.1; 126/91 A; 99/403

(58) Field of Classification Search .............. 126/391.1, 126/90 R, 91 R, 91 A, 116 R, 110 R, 343.5 R, 126/343.5 A, 387.1, 376.1, 374.1; 38/38; 165/44.2, 146, 174, 109.1, 183, 179, 367.1, 165/367.3; 99/403; 122/155.2, 159, 156, 122/10, 17.1, 19.2, 44.2, 115; 366/181.5, 366/337, 338, 341; 431/8, 9, 10, 159, 181, 431/187; 432/209
See application file for complete search history.

(56) References Cited

U.S. PATENT DOCUMENTS

| 1,072,349 | A | * | 9/1913 | Mott, Jr. ..................... 431/193 |
| 1,384,598 | A | * | 7/1921 | Butts ........................... 431/354 |
| 1,636,169 | A | * | 7/1927 | Chalmers .................... 431/117 |
| 1,656,836 | A | * | 1/1928 | Smith .......................... 165/146 |
| 1,741,553 | A | * | 12/1929 | Breese, Jr. .................... 431/64 |
| 1,828,023 | A | * | 10/1931 | Brill ........................... 122/14.2 |
| 1,830,866 | A | * | 11/1931 | Ziegler .................... 122/250 R |
| 1,991,609 | A | * | 2/1935 | Furlong ....................... 431/175 |
| 2,070,535 | A | * | 2/1937 | Hansen ........................ 431/189 |
| 2,176,869 | A | * | 10/1939 | Childs ....................... 126/391.1 |
| 2,251,710 | A | * | 8/1941 | Livar ........................... 239/552 |
| 2,295,784 | A | * | 9/1942 | Handley ...................... 431/156 |
| 2,400,653 | A | * | 5/1946 | O'Dowd ................... 126/391.1 |
| 2,429,360 | A | * | 10/1947 | Kells ........................ 126/391.1 |
| 2,515,618 | A | * | 7/1950 | Wallerius .................. 126/376.1 |
| 2,582,577 | A | * | 1/1952 | Zink et. al. .................... 431/346 |
| 2,617,407 | A | * | 11/1952 | Johnson .................... 126/374.1 |
| 2,712,308 | A | * | 7/1955 | Keating .................... 126/391.1 |
| 2,720,918 | A | * | 10/1955 | Buysse ........................ 431/156 |
| 2,822,867 | A | * | 2/1958 | Sassmanhausen ........... 431/155 |
| 2,867,271 | A | * | 1/1959 | Jackson ....................... 431/278 |
| 2,887,074 | A | * | 5/1959 | Friedberg ................. 126/91 A |
| 3,266,486 | A | * | 8/1966 | Wilson ..................... 126/374.1 |
| 3,275,245 | A | * | 9/1966 | Moore ......................... 431/181 |
| 3,540,707 | A | * | 11/1970 | Warmbrodt ................. 431/349 |
| 3,990,433 | A | * | 11/1976 | Keating .................... 126/391.1 |

(Continued)

FOREIGN PATENT DOCUMENTS

GB 2342569 * 4/2000

(Continued)

Primary Examiner—Carl D Price
(74) Attorney, Agent, or Firm—Brinks Hofer Gilson & Lione

(57) ABSTRACT

An improved heat exchange mechanism for a deep fat fryer is described. The improvement includes a baffle plate wherein the walls are corrugated and horizontally aligned holes are provided along the length of the plate with the interior two rows of such holes having decreasing diameter in the direction of flow of the combustion gases through the heat tube. In addition, holes are formed at the edges of the corrugations. A burner shield is provided restricting the flow of secondary air to the burner tube.

16 Claims, 6 Drawing Sheets

U.S. PATENT DOCUMENTS

| | | | | |
|---|---|---|---|---|
| 4,052,141 | A | * | 10/1977 | Dudheker et al. ............ 431/181 |
| 4,125,359 | A | * | 11/1978 | Lempa ........................ 431/175 |
| 4,672,919 | A | * | 6/1987 | Staats ........................ 122/14.22 |
| 4,685,425 | A | * | 8/1987 | Eising ........................ 122/18.3 |
| 4,690,127 | A | * | 9/1987 | Sank ........................ 126/391.1 |
| 4,858,592 | A | * | 8/1989 | Hayek et al. ............... 126/391.1 |
| 4,895,137 | A | * | 1/1990 | Jones et al. ............... 126/391.1 |
| 4,913,041 | A | * | 4/1990 | Taber et al. .................... 99/403 |
| 4,924,816 | A | * | 5/1990 | Moore et al. ................ 122/17.1 |
| 4,940,042 | A | * | 7/1990 | Moore et al. ................ 122/18.2 |
| 5,050,582 | A | * | 9/1991 | Almond et al. ........... 126/374.1 |
| 5,244,381 | A | * | 9/1993 | Cahlik ........................ 431/171 |
| 5,253,566 | A | * | 10/1993 | McCabe et al. ................ 99/403 |
| 5,333,597 | A | * | 8/1994 | Kirkpatrick et al. ..... 126/110 R |
| 5,441,405 | A | * | 8/1995 | Bedford et al. ............. 431/286 |
| 5,681,159 | A | * | 10/1997 | Benedek et al. ................. 431/9 |
| 5,746,194 | A | * | 5/1998 | Legutko ................... 126/91 A |
| 5,746,195 | A | * | 5/1998 | Codazzi et al. ........... 126/391.1 |
| 5,778,871 | A | * | 7/1998 | Herring .................... 126/391.1 |
| 5,799,646 | A | * | 9/1998 | Zia et al. ................. 126/110 R |
| 5,941,200 | A | * | 8/1999 | Boros et al. ............... 122/14.22 |
| 5,975,883 | A | * | 11/1999 | Carbone et al. ................. 431/8 |
| 6,004,129 | A | * | 12/1999 | Carbone et al. ............. 431/354 |
| 6,109,216 | A | * | 8/2000 | Reynolds et al. ......... 122/13.01 |
| 6,178,964 | B1 | * | 1/2001 | McFadden et al. ....... 126/391.1 |
| 6,196,118 | B1 | | 3/2001 | Savage et al. |
| 6,209,536 | B1 | * | 4/2001 | McNamara ............... 126/391.1 |
| 6,439,171 | B1 | * | 8/2002 | McCall ....................... 122/19.2 |

FOREIGN PATENT DOCUMENTS

| | | | |
|---|---|---|---|
| JP | 57-36948 | * | 2/1982 |
| JP | 62-5022 | * | 1/1987 |
| JP | 2000-104906 | * | 4/2000 |

* cited by examiner

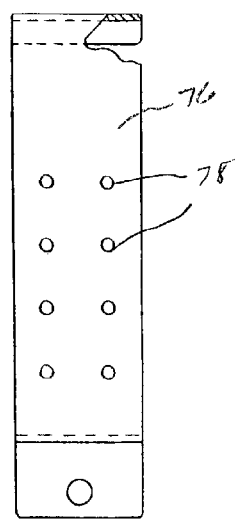
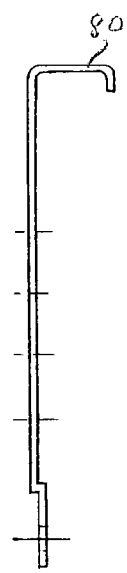
FIG. 10　　　　　FIG. 11
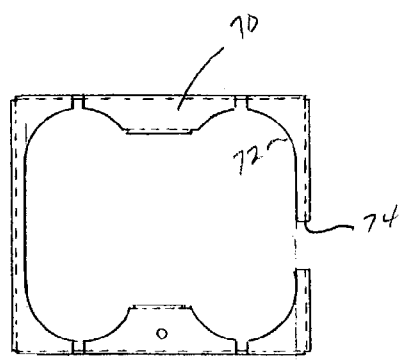
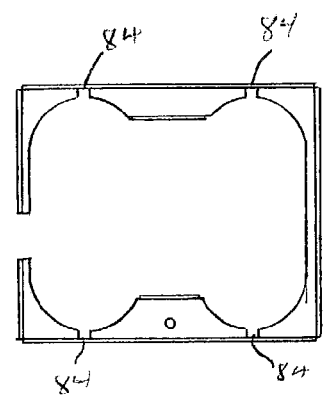
FIG. 12　　　　　FIG. 13
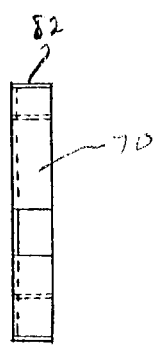
FIG. 14　　　　　FIG. 15

DEEP FAT FRYER WITH IMPROVED HEAT TRANSFER

FIELD OF THE INVENTION

This invention relates to deep fat fryers and in particular to deep fat fryers which use gas burners as a source of heat to be transferred to cooking oil.

DESCRIPTION OF THE PRIOR ART

Commercial deep fat fryers are used to cook a variety of foods including fast foods such as French fries and fish. In operation, it is necessary to have the cooking oil at a substantially elevated temperature and to maintain the oil during the cooking process at a high temperature to provide a crisp relatively fat free, cooked product.

Typically a deep fat fryer will include a vat or tank for the cooking oil with a plurality of heat tubes extending through the lower portion thereof. Gas burners are provided at one end of each tube and the products of combustion after passing through the tubes are exhausted through a flue or similar device.

In certain prior art fryers the heat tubes where U-shaped or S-shaped to assist in heat transfer by maintaining the products of combustion from the burner within the tube for an extended period of time. However, when the products of combustion travel around a bend in the tube, corrosion can occur ultimately causing tube failure.

If the heat tubes extend through the tank without a bend therein it is likely that the unit will be inefficient in its heat transfer as the hot gases will pass through the tube and be exhausted very rapidly. Accordingly, it is known to provide a baffle mechanism within the tube to assist in heat transfer, and to generate a swirling motion to the products of combustion as they pass through the tube to more efficiently transfer heat to the tube walls. In U.S. Pat. No. 6,196,118 assigned to the assignee of this invention there was described such a baffle system wherein each baffle plate was a rectangular plate extending longitudinally along the longitudinal axis of each heat tube with wings struck therefrom in vertical columns and longitudinal horizontal rows. The wings left openings in the plate so that the hot gases passing there along would be deflected through the plate resulting in a back and forth or swirling type motion to effectuate heat transfer.

At the entrance of each heat tube a burner is provided, and in many instances this will be a conventional in-shot burner. The burner axis can coincide with the longitudinal axis of the heat tube, or if space is available a 90° burner may be used wherein the burner jet makes a 90° turn to align with the longitudinal axis of the heat tube. The burner could be mounted at an angle to the longitudinal axis of the heat tube. The burner could be mounted at an angle to the longitudinal axis of the heat tube or at a 90° angle. It is necessary, however, to provide secondary air at the entrance to the heat tube to assist in combustion of the gas at the burner nozzle, and obviously, the presence of the secondary air at a temperature below the temperature of the burner flame will affect efficiency.

In prior art deep fat fryers it was generally believed that increased efficiency depended upon increasing the dwell time of the products of combustion within the heat tube. As noted above, the increased dwell time was provided by S-shaped or U-shaped burner heat tubes, or in the case of straight heat tubes with baffle plates although baffle plates were known for use with U-shaped or S-shaped tubes also.

SUMMARY OF THE INVENTION

It has been discovered, however, the efficiency in a deep fat fryer with a gas fired burner can be increased to 65-70% by providing a shield around the burner at the entrance to the heat tube to restrict the secondary air admitted to the burner tube, and in addition, in a unique baffle design of this invention, the products of combustion can be directed through longitudinal holes in horizontal rows through a corrugated baffle plate wherein the walls are angled to the direction of flow so that combustion products will both pass through holes in the plate, and circulate around the plate for more efficient heat transfer. In addition, in the preferred embodiment, four longitudinal rows of holes are provided, mutually spaced, vertically with the center two rows of holes in each plate being of decreasing diameter in the direction of flow of the combustion products.

Accordingly, it is an object of this invention to provide an efficient heat transfer mechanism for a deep fat fryer to increase the efficiency thereof to 65-70%.

It is a further object to provide a deep fat fryer using a plurality of straight heat tubes extending through the vat of cooking oil wherein each heat tube contains a baffle plate and the burner for each heat tube is shielded to restrict access of secondary air thereto and wherein each fryer operates without a blower to force secondary air through the tubes.

It is further object of this invention to provide a baffle plate for a each heat tube in a deep fat fryer wherein the baffle plate is corrugated with the walls thereof forming 60° angles extending vertically along the plate and each wall has a vertical row of holes therein for admission of combustion products therethrough.

It is a further object of this invention to provide a baffle plate for a heat tube in a deep fat fryer wherein the plate is corrugated with walls angled in the direction of the flow of combustion products through the tube so that each angled wall presents itself to the flow of combustion products and a plurality of holes are provided in each wall to permit the admission of such combustion products.

It is yet another object of this invention to provide a corrugated baffle plate for a heat tube in a deep fat fryer wherein each plate has walls angled at an acute angle to the direction of flow and each wall has a vertical row of holes wherein two of such holes are of decreasing diameter along the lengths of the plate.

These and other objects will be readily apparent with reference to the drawings and following description wherein:

BRIEF DESCRIPTION OF THE DRAWINGS

FIG. 10 is a divider plate for a dual burner shield.
FIG. 11 is a side view of the divider plate of FIG. 10.

FIG. 12 is front view of a dual burner shield with the divider plate removed.

FIG. 13 is a rear view of the plate of the shield of FIG. 12.

FIG. 14 is a right side view of the dual shield of FIG. 12.

FIG. 15 is a top view of the shield of FIG. 12.

DETAILED DESCRIPTION OF THE INVENTION

Figure 1:
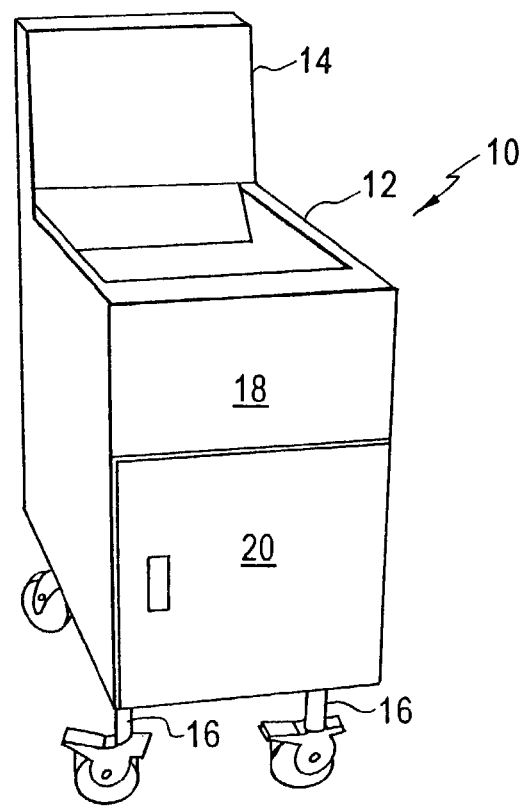
FIG. 1 is a perspective view of a typical deep fat fryer.

With attention to the drawings and FIGS. 1-4 in particular, a deep fat fryer of this invention 10 includes a tank 12, a rear flue 14 and may be mounted on wheels 16. The front 18 has an access door 20 for access to the burner or burners and the like. A filter system (not shown) also would be provided with access through door 20.

Figure 2:
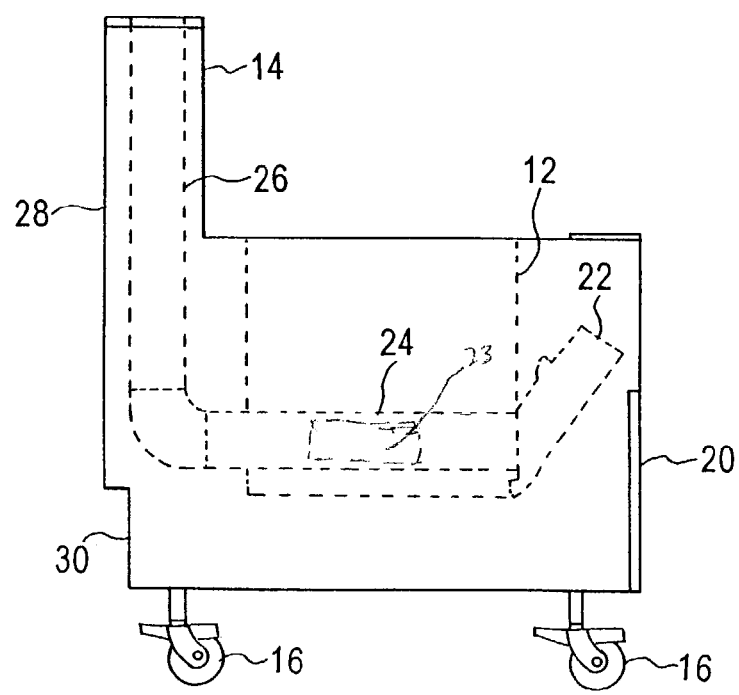
FIG. 2 is a side view of the fryer of FIG. 1.
Figure 3:
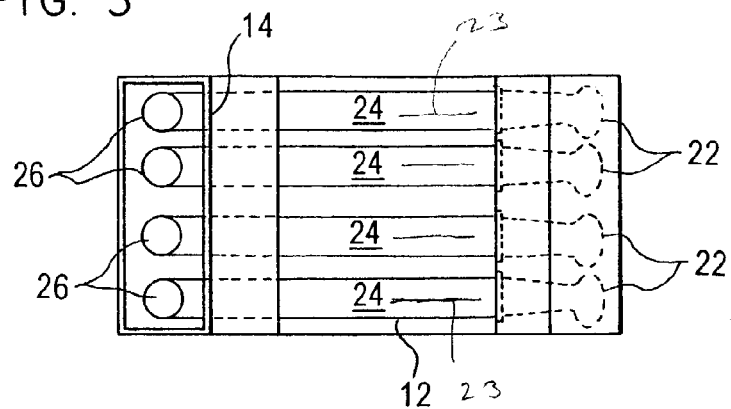
FIG. 3 is top view of a single vat fryer with four heat tubes extending therethrough.
Figure 4:
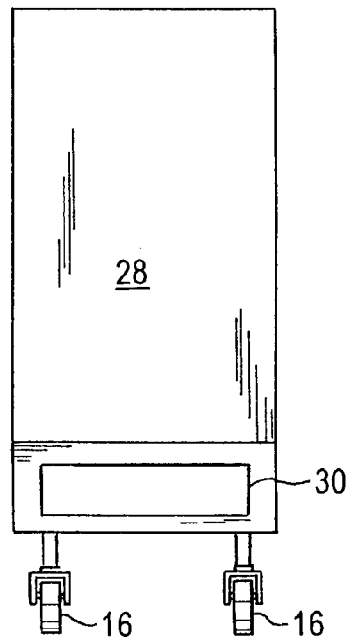
FIG. 4 is a back view the fryer of FIG. 1.
Figure 5:
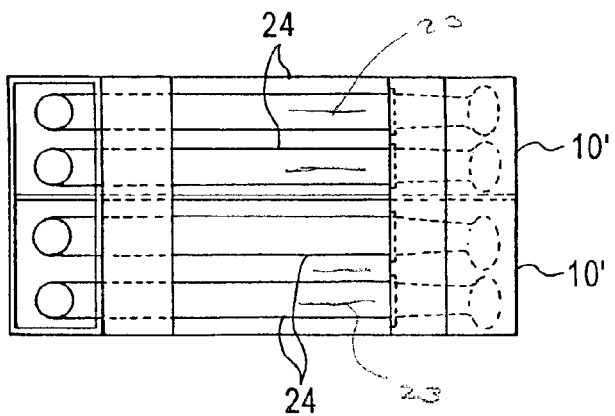
FIG. 5 is a top view of a split vat fryer showing two heat tubes in each vat.

In the embodiment of FIG. 2 there is shown schematically a burner 22 and a heat tube 24 extending through tank 12 to a flue pipe 26 in flue 14. The source of gas for the burner 22 is not shown. Burner 22 then sends a jet of products of combustion through the heat tube 24 and the oil (not shown) disposed in tank 12 will be heated by conductive heat transfer from the wall of the tube 24. The products of combustion then exit tube 24 into flue pipe 26 for exhaustion. As shown in FIG. 4 the rear 28 of the fryer 10 defines an opening 30 which is a source of air for the burner 22. In the embodiment of FIG. 3 four heat tubes 24 are shown extending through a single tank or vat 12. Each tube 24 has a separate burner 22 and a baffle plate 23 (shown schematically). In the embodiment of FIG. 5 twin deep fat fryers 10 are shown each with two burner tubes 24 as will be obvious to those skilled in the art, typically two, four, or even five burner tubes may be provided. The embodiment of FIG. 5 is also known as a split vat and each of the fryers 10' may be independently operated.

The kitchen space requirements will dictate, at least in part, the size of the tank and deep fat fryer used. In some situations a single unit with two burner tubes would be sufficient whereas if more space is available and a higher volume of food to be cooked needed, it may be necessary to provide a larger tank with four or five heat tubes. In each instance each tube would have its own burner.

This invention is not intended to be limited to the type of deep fat fryer 10 or 10' shown or to the number of burners and heat tubes which are provided as will be subsequently described. The embodiments of FIGS. 1-5 are merely shown as illustrations.

Figure 18:
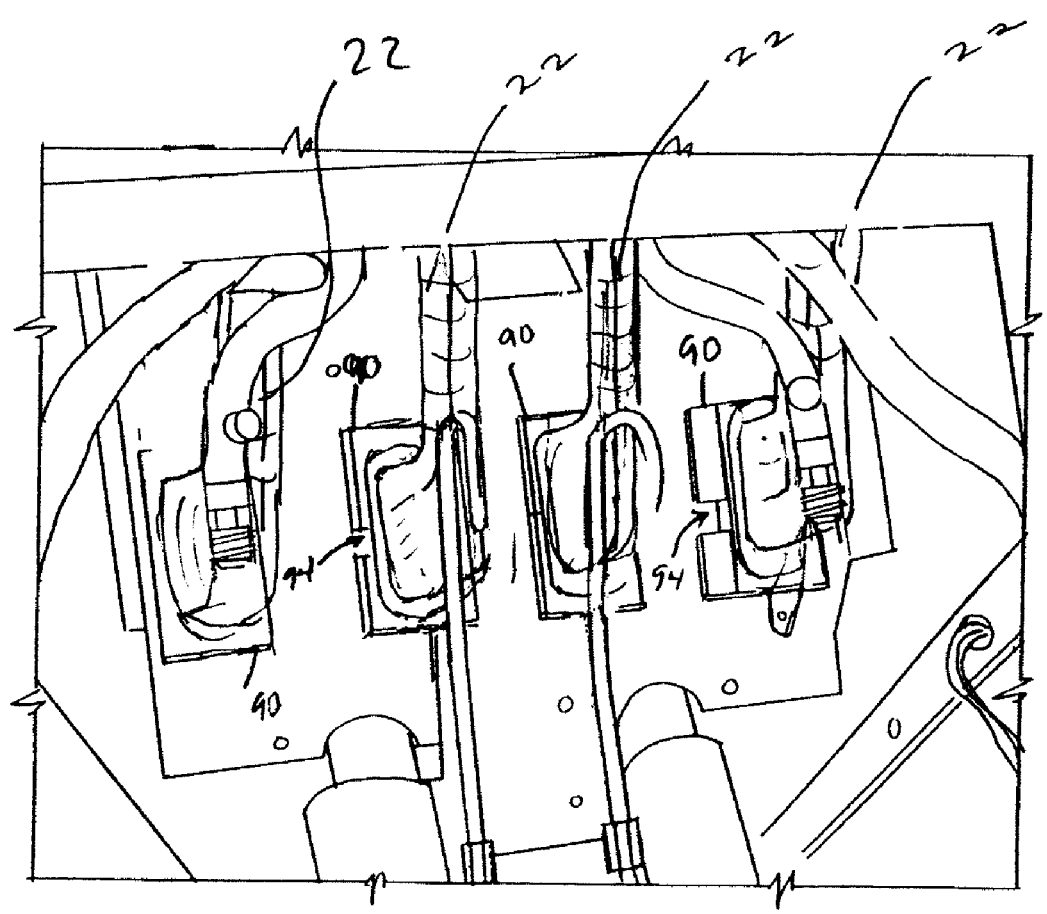
FIG. 18 is a fragmentary view of the burner assembly for a split vat fryer of FIG. 5 showing a burner mounted perpendicularly to the heat tube.

In the preferred embodiment of this invention a burner is disposed at an angle to the longitudinal axis of the heat tube. In some instances a conventional in-shot burner may be used wherein the burner axis coincides with the longitudinal axis of the heat tube or, if space is available a 90° burner may be used where the burner jet makes a 90° turn to align with the longitudinal axis of the heat tube, as shown in FIG. 18. The burner can then be mounted at an acute angle to the longitudinal axis of the heat tube, coaxially with the longitudinal axis or at a 90° angle thereto. As will be obvious to those skilled in the art, this invention is not limited to the type of burner or its mounting angle to the heat tube.

Figure 7:
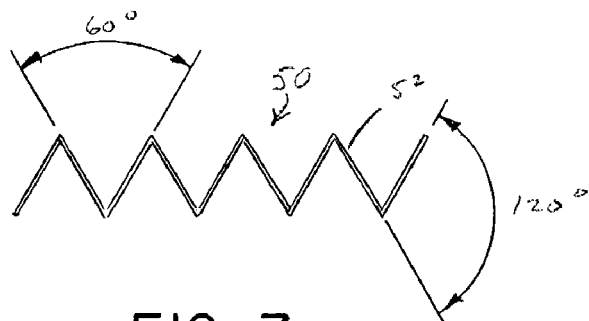
FIG. 7 is a top view of the baffle plate of this invention.
Figure 9:
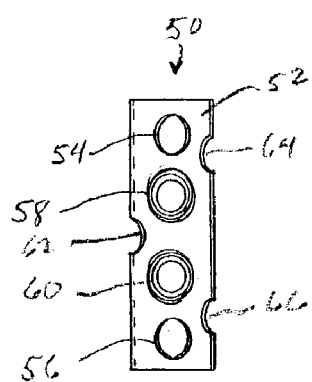
FIG. 9 is an end view of the baffle plate of FIG. 7 looking in the direction of the flow of combustion gases through a heat tube.
Figure 8:
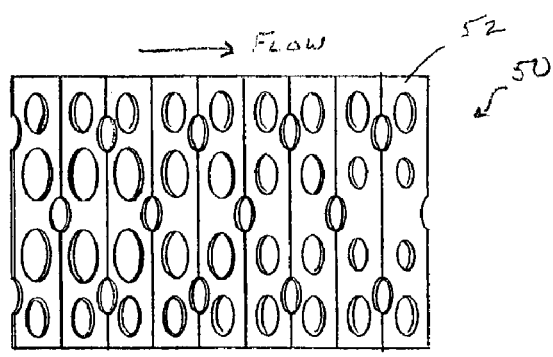
FIG. 8 is a side view of the baffle plate of FIG. 7.

Each heat tube 24 has an internal baffle plate according to this invention. The baffle plate 50 is shown in FIGS. 7-9 and consists of a corrugated plate with walls 52 disposed at 60° angles as shown in FIG. 7. FIG. 8 is a side view of the baffle plate of this invention and FIG. 9 is an end view of the baffle plate of FIGS. 7 and 8 looking along the longitudinal axis of a burner tube in the direction of flow of combustion products shown by the arrow in FIG. 8.

In the preferred embodiment of this invention there are four rows of horizontally aligned holes in the face of each wall 52 of baffle 50. Upper and lower holes 54 and 56 are uniform in diameter along the lengths of the baffle plate 50. Interior holes 58 and 60 are of decreasing diameter along the direction of flow of the combustion products through a heat tube. In addition, alternate single and double holes 62, and 64 and 66, respectively are provided at the juncture of each wall 52 in plate 50.

Figure 6:
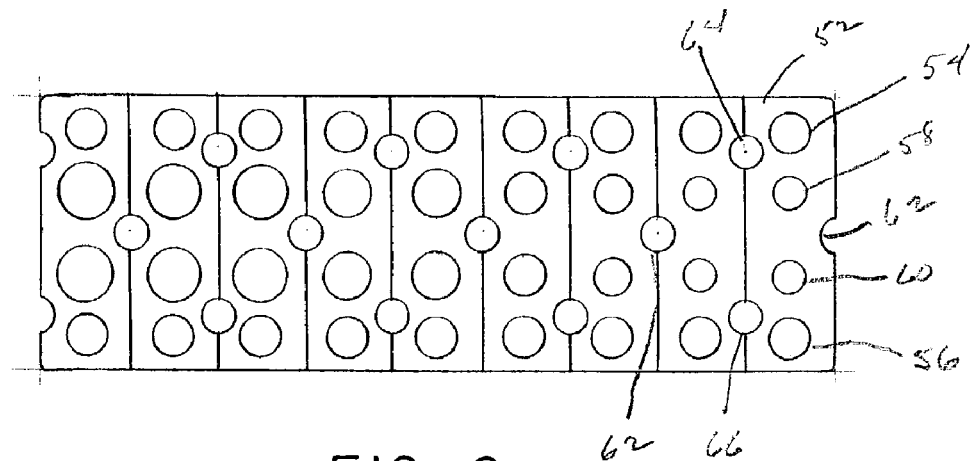
FIG. 6 is a front view of a baffle plate according to this invention prior to bending to illustrate the hole pattern therein.

FIG. 6 is a flattened version of the plate 52 for the purpose of illustrating the hole patterns for holes 54, 56, 58, 60, 62, 64 and 66. The holes with the exception of the hole pattern for holes 58 and 56 are uniform in diameter.

Figure 17:
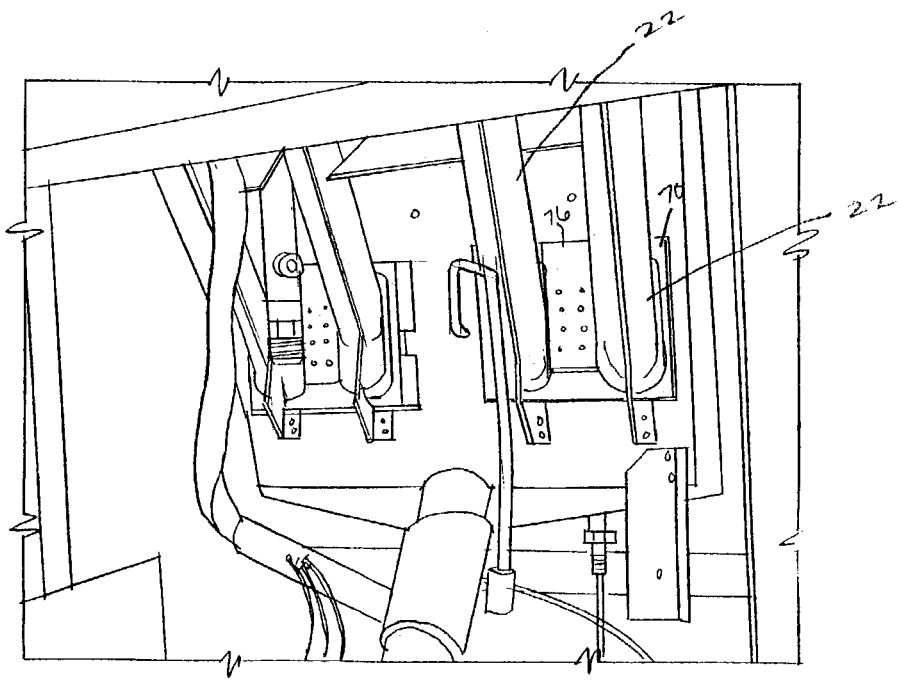
FIG. 17 is a fragmentary front view of the burner assembly of a single vat fryer of FIG. 3.

In order to further increase the efficiency of a deep fat fryer it has been discovered that a burner shield restricting the secondary air into the burner tube will achieve a much greater efficiency in the order of 65-70%. In FIGS. 10-15 there is shown a burner shield for a full vat fryer such as shown in FIG. 3. The assembled burner shield of FIGS. 10-15 is also shown in FIG. 17. The shield consists of a plate 70 having oval cut out portions 72 for receiving a pair of burners 22. Plate 70 then mounts directly on the burner assembly which in turn is mounted on the heat tube entrance in the conventional fashion. Plate 72 is notched in a wall with a notch 74 for the admission of the pilot flame to the burner for main burner ignition. In addition, a central divider plate 76 is provided which is shown in FIGS. 10 and 11 and in FIG. 17. Plate 76 has a plurality of holes 78 for the admission of a pilot flame for main burner ignition. Divider plate 10 includes a lip 80 which hooks over the upper portion 82 of plate 70. With attention to FIG. 15, notches 84 are further provided in plate 70 to assist in mounting the burner assembly.

Figure 16:
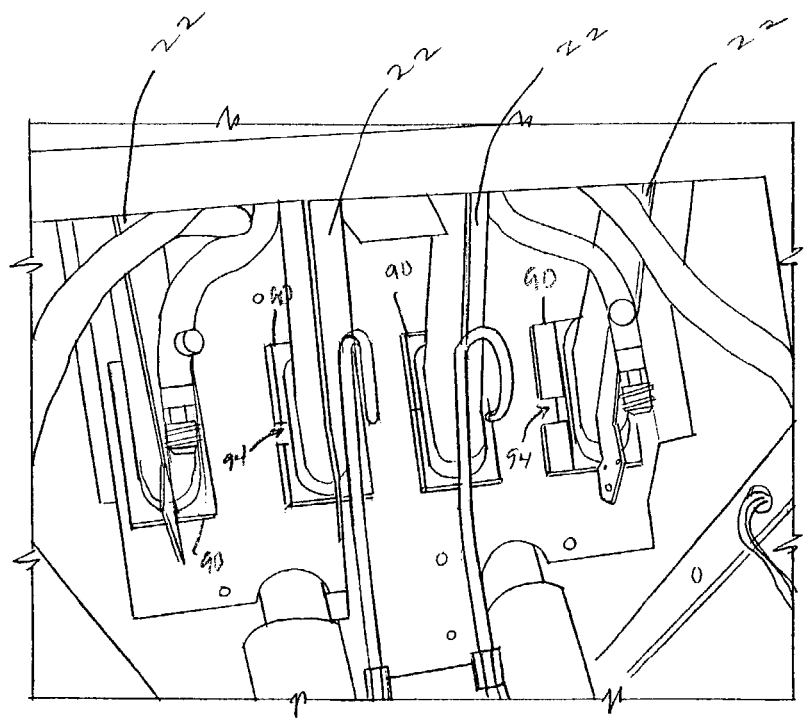
FIG. 16 is a fragmentary view of the burner assembly for a split vat fryer of FIG. 5.

FIG. 16 shows a burner assembly similar to FIG. 5 wherein a separate shield 90 is provided for each burner assembly 22 and each plate 90 has a notch 94 similar to notch 74 in plate 70 for the admission of the pilot flame for ignition of the burner 22. As shown in FIG. 16, the burner shield 90 is mounted at an entrance to the tube of the burner assembly and the burner shield 90 substantially surrounds and encloses a first end of the tube of the burner shield.

As is known to those skilled in the art, in the case of the embodiment of FIG. 17 a single plot will be used, and flame will blow from one burner to the adjacent burner to ignite it across the plate 76. In the case of the embodiment of FIG. 16, a separate burner will be provided for each heat tube.

In summary, it has been discovered that the efficiency of the heat exchange in a deep fat fryer can be very substantially increased by providing a burner shield, and the specifically designed internal baffle plate of this invention. The burner shield is essentially a frame which surrounds the burner assembly and is mounted on the wall of the vat or on the support for the vat so that the shield is coupled between the burner and the heat tube and controls the secondary air admitted to the burner. A blower used in conventional high efficiency fryers for entraining primary and/or secondary air into the burner system is not necessary.

In addition, the baffle plate of a specific design of this invention is a corrugated rectangular shaped plate which is disposed along the longitudinal axis of the heat tube. The plate consists of a wall wherein each adjacent wall defines an interior angle of 60°. The face of each wall mounts a vertical row of holes and the holes on the adjacent walls are aligned so that the circular holes have centers in a common horizontal plane. The preferred embodiment of this invention has four of such holes in each wall, and the center two of such holes are of decreasing diameter along the lengths of the plate in the direction of flow of the combustion gases.

In addition, each wall forms a junction with adjacent walls and the junction also forms a plurality of holes. In the preferred embodiment of this invention the holes in such junctures are alternating one or two such holes along the length of the plate.

It will be readily seen by one of ordinary skill in the art that the present invention fulfills all of the objects set forth above. After reading the foregoing specifications, one of ordinary skill will be able to effect various changes, substitutions or equivalents and various other aspects of the invention as broadly disclosed herein. It is therefore intended that the protection granted hereon be limited only by the definition contained in the appended claims and equivalents thereof.

The invention claimed is:

1. A deep fat fryer, comprising:
    a housing;
    a vat within the housing for containing cooking oil;
    at least one heat tube extending through the vat;
    a burner assembly adjacent each heat tube, the burner assembly sending a flow of hot gases through the heat tube to heat walls of the heat tube; and
    at least one elongated baffle plate disposed in the at least one heat tube, said plate being corrugated with a plurality of angled walls, each wall being rectangular and disposed at an angle to the flow of hot gases, a face of each wall containing a plurality of circular holes with said holes in said wall being aligned in horizontal rows wherein diameters of the holes in at least one of said rows decrease along a length of the plate in a direction of said flow.

2. The fryer of claim 1 wherein the face of each wall forms four vertically aligned holes.

3. The fryer of claim 2 wherein two horizontal rows of said holes of decreasing diameter are formed.

4. The fryer of claim 3 wherein said two rows are the interior rows of holes.

5. The fryer of claim 1 wherein adjacent walls define an interior angle of about 60°.

6. The fryer of claim 5 wherein a portion of at least one hole is formed at a junction of adjacent walls.

7. The fryer of claim 6 wherein the junction of each adjacent wall forms an edge and each edge forms a portion of at least one hole.

8. The fryer of claim 1, wherein each wall has a first edge that forms a portion of two holes and a second edge that forms a portion of one hole.

9. The fryer of claim 1 further comprising a shield surrounding the burner access to each heat tube to restrict secondary air to said burner.

10. The fryer of claim 9 wherein each shield is a frame surrounding the burner and coupled to the heat tube and forming a notch of predetermined dimensions therein as the sole opening for pilot ignition flame to said burner.

11. A deep fat fryer, comprising:
    a housing;
    a vat within the housing for containing cooking oil;
    at least one heat tube extending through the vat for heating the oil;
    a gas burner mounted at an entrance of each tube; and
    a burner shield coupled to said burner, the burner shield surrounding an entrance to said tube and restricting an entrance of secondary air to said burner,
    further comprising an elongated baffle plate disposed in the at least one heat tube, the plate being corrugated with a plurality of walls, each wall at an angle to the other walls, each wall being rectangular and disposed at an angle to a flow of hot gases through the heat tube, a face of each wall forming a plurality of circular holes with said holes in said wall being aligned in horizontal rows, and a diameter of the holes in at least one of said rows decreasing along the length of the plate in the direction of said flow.

12. The fryer according to claim 11 wherein the face of each wall forms four vertically aligned holes.

13. The fryer according to claim 11 wherein adjacent walls define an interior angle of about 60°.

14. The fryer according to claim 11 wherein a portion of at least one hole is formed at a junction of adjacent walls.

15. The fryer according to claim 11 further comprising a housing surrounding said burner and extending into a first end of said tube.

16. The fryer according to claim 11 wherein the burner shield has a substantially rectangular outer surface.

* * * * *